June 25, 1935.  E. LANDER  2,005,998

AUTOMATIC SAW FILING DEVICE

Filed Nov. 28, 1932

Erik Lander INVENTOR.
BY Harry G. Schroeder
ATTORNEY.

Patented June 25, 1935

2,005,998

UNITED STATES PATENT OFFICE 2,005,998

AUTOMATIC SAW FILING DEVICE

Erik Lander, Oakland, Calif.

Application November 28, 1932, Serial No. 644,710

3 Claims. (Cl. 76—36)

This invention is an automatic saw filing device adapted to automatically advance a hand-operated file along the saw as the file is operated.

In the present system of filing saws by hand, it is necessary to raise the file out of one recess after filing one tooth and place it in position to file the next tooth.

The main object of the present invention is to provide a device for attachment to the file, which coincidently functions as a thumb and finger hold at the end of the file, and which will automatically cause the file to move from one tooth to another at a predetermined stroke of the file.

Another object of the invention is to provide a device as outlined with means whereby the angular relation of the file to the device may be varied so as to obtain the proper slope of the tooth.

A further object of the invention is to provide the means for automatically advancing the file along the saw with suitable adjustment whereby different tooth pitches may be accommodated.

Other objects and advantages of the invention will become apparent as the following description is read on the drawing forming a part of this specification and in which similar reference characters are used to designate similar parts throughout the severals views, of which:

Figure 1:
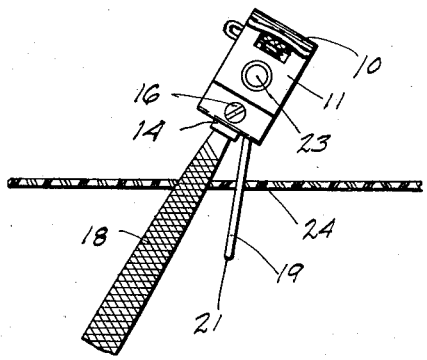
Fig. 1 is a plan view of my invention superposed over a saw and in a position transferring the file to another tooth.

The invention consists of a body provided with a handle or thumb and finger grip 10, which is arcuately formed, said body consisting of a section of metal of rectangular cross section, so as to provide a broad surface for the purpose of retaining the device in fixed position when held between the thumb and finger. The lower portion of this thumb and finger grip 10 continues rearwardly as indicated at 11, this main portion being formed upwardly as indicated at 12 and terminating in a U-shaped bearing member 13 as shown, although this portion may be of any type or form which will function in the same manner.

Rotatably mounted longitudinally of the main portion is a sleeve 14 which is provided with a suitable recess 15, this recess being formed to suit the specific file to be used, and which is usually of triangular form. This sleeve is secured against rotation by means of a set screw 16, and a set screw 17 in the sleeve is used for securing the device to the end of the file 18. By means of this rotatable sleeve 14, the file may be positioned at any suitable angle relative to the main portion 11 so as to compensate for variations in angularity of the teeth of the saw.

A finger 19 having an arcuate or convex undersurface 20 and terminating in a plane above the bottom of the file 18 as indicated at 21 is fixedly secured in a pivot member 22, to pivot about the pivot point 23, this arcuate undersurface 20 cooperating with the serrations or teeth 24 of the saw 25.

Means is provided for limiting the arcuate or swinging movement of the finger 19, as also for coincidently adjusting the finger for different tooth pitches, and consists of a set screw 26 which threadedly cooperates with a depending portion 27 and the handle 10, this depending portion being formed from a portion of the handle 10 as indicated at 28, by slitting and forming down this portion, this set screw 26 having a conical point as indicated at 29, which conical point cooperates with a conical recess 30 formed transversely to the axis of the pivot member 22, the conical recess being greater in diameter than the diameter of the set screw permitting oscillation of the finger 19 through a predetermined angle.

Means for urging the finger away from the file, or in diverging relation to the file consists of a spring 31 which is formed spirally between the head 32 of the screw 26 and the depending member 27, and thence continues tangentially following with the return bend, the terminal 33 of which cooperates with one side of the recess 30, in this manner, urging the finger 19 in divergent relation to the file 18 and coincidently acting as locking means for the set screw, the tension of the spiral portion 34 of the spring preventing rotation of the screw, and the projecting portion 31 of the spring urging the pivot 22 in one direction about the pivot center 23. It will be noted that the finger 19 can be moved toward the file a predetermined distance against the action of the spring 31.

The sleeve 14 may be removed from the device and replaced with a different sleeve having a suitable aperture therethrough where different shaped files are to be used, and the files may readily be replaced in case of wear or breakage. The curved thumb and finger grip 10 fits the contour of the thumb, and the other portion permits the index finger to position about the outer surface of this grip, and the flat shape transversely provides a suitable grip to maintain the device against rocking during operation.

It will be understood that different types of saws have different tooth angles, some saws having teeth which are substantially centered or have the same angle on the back of the tooth as on the front, while other saws have teeth in which the front and the back of the tooth are both inclined in the same direction from the vertical although at different angles, and it is for this purpose that the adjustable sleeve is provided. Saws are also provided with many different numbers of teeth per inch for which purpose the adjustment of the pivot 22 and coincidently the finger 19 is provided.

Figure 2:
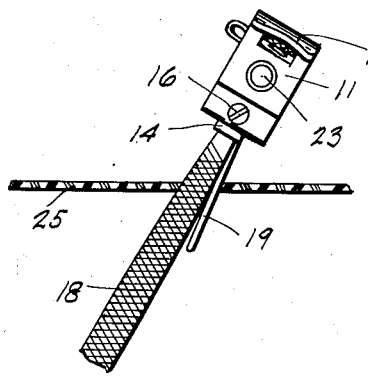
Fig. 2 is a view similar to Fig. 1 except showing the file after transfer to the other tooth.
Figure 4:
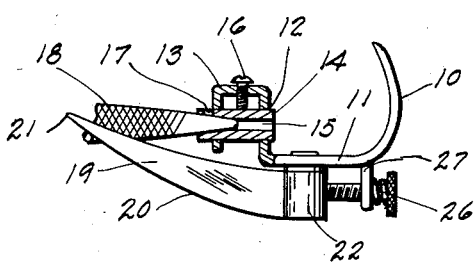
Fig. 4 is a side elevation of my invention.
Figure 3:
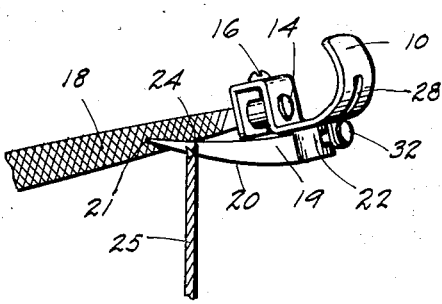
Fig. 3 is a perspective view showing the saw blade in section and clearly indicating the operation of the device as viewed from the side.
Figure 5:
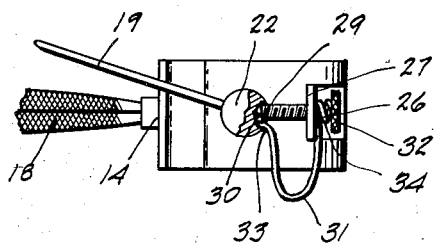
Fig. 5 is a bottom view of Fig. 4, with a small section broken away to show the adjustment of the finger.

The operation of the device is clearly indicated in Figs. 1, 2 and 3, in which the saw is indicated at 25, the saw being clamped in the usual saw clamping device (not shown). The file 18 is rotatably adjusted to correspond with the rake of the teeth, while the main portion 11 is maintained in a plane parallel to the plane of the teeth, the finger 19 is adjusted by means of the screw 26, so that as the file is drawn backwardly, as viewed in Figs. 1 and 2 in a diagonally downward direction, that the end 21 of finger 19 registers with the third tooth in advance of the file 18. In drawing the file backwardly, the arcuate surface 20 rides in the tooth recess, raising the file out of the preceding tooth, the next forward push on the file causing the file to move over toward the finger against the action of the spring 31, engaging the next mating tooth as the finger rides down out of the cooperating recess, the further forward motion of the file acting on the tooth, the rearward motion thereof acting throughout its length until such time as the finger again engages another advanced tooth.

By means of this device it will be noted that a forward motion of the file will file the tooth, that the rearward motion will also act to file the tooth until the finger engages an advanced tooth, and due to the fact that the file is held in a definite position, cooperation of the finger 19 with the saw will automatically raise the file out of cooperation with the tooth, and that the initial forward motion of the file automatically moves the file over toward the finger 19 against the action of the spring, and this finger guides the file into the next advanced similar tooth. The normal operation of the file while being retained in a normal position during the filing operation will cause the device to function to advance the file along the saw and cause the file to register with an advanced tooth at each return stroke of the file.

Having described an operative device it will be understood that variations in construction and arrangement of parts which are consistent with the appended claims may be resorted to without detracting from the spirit or scope of the invention or sacrificing any of the advantages thereof.

I claim:

1. A saw filing device, comprising a frame including a finger-engageable grip, and a U-shaped member rigidly connected together, a sleeve rotatably mounted in said member formed with a recess to receive the end of a file, means for securing the end of a file in said sleeve, means for securing said sleeve and file at adjusted rotary positions, an arcuate finger having a recess in its base and pivotally mounted in said frame having its axis of rotation in line with the recess in said sleeve and file secured therein, a set-screw cooperating with said recess to limit the swinging movements of said finger, and a spring tending to urge said finger into its position of maximum of angularity relative to the plane of the file.

2. A saw filing device comprising a body having one end so shaped as to provide a thumb and finger grip and having its other end so shaped as to provide a bearing, a file-engageable sleeve rotatively mounted in said bearing, means for normally preventing rotation of said sleeve, a lug depending from said body, an arcuate feeder finger directly pivoted to the underside of said body between said grip and said bearing, said finger being movable laterally with respect to the body, means for yieldably moving said finger in a predetermined direction on its pivotal axis, and a set screw working in said lug and so positioned as to engage and hold said finger in adjusted radial positions with respect to its pivotal axis.

3. A saw filing device comprising a body provided at one end with a thumb and finger grip and at the other end with a U-shaped bearing, a pivot pin depending from the underside of said body at a position between the grip and the bearing, a lug also depending from the underside of said body at a position contiguous to said grip, a file engageable sleeve rotatively mounted in said bearing, means for normally preventing rotative movement of said sleeve, an arcuate feeder finger pivoted to said lug in such manner as to move laterally with respect to said body, means for yieldably moving said finger in a predetermined lateral direction, and a set screw carried by said lug and so positioned as to engage said finger to hold it in adjusted radial positions with respect to its pivotal axis.

ERIK LANDER.